July 8, 1941.  H. NUTT  2,248,378
FRICTION CLUTCH
Filed July 15, 1939  2 Sheets-Sheet 1
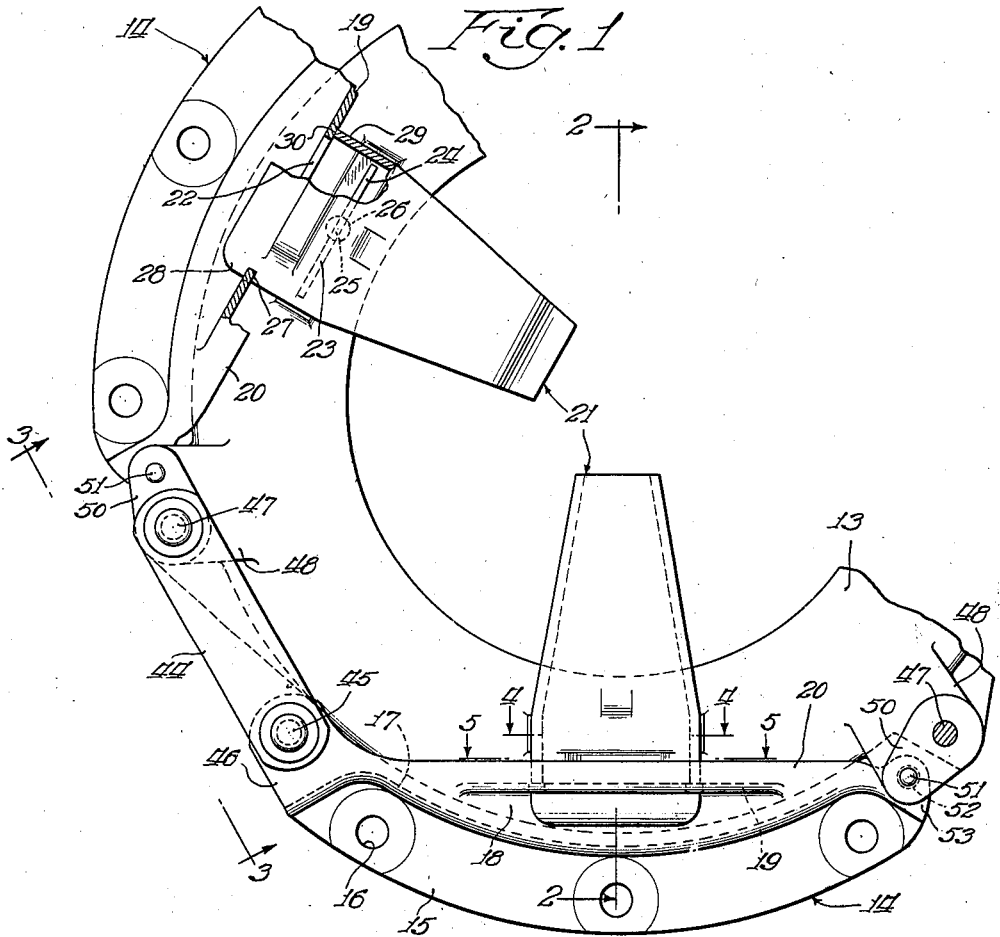
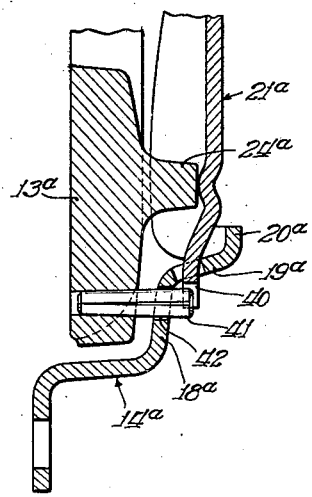
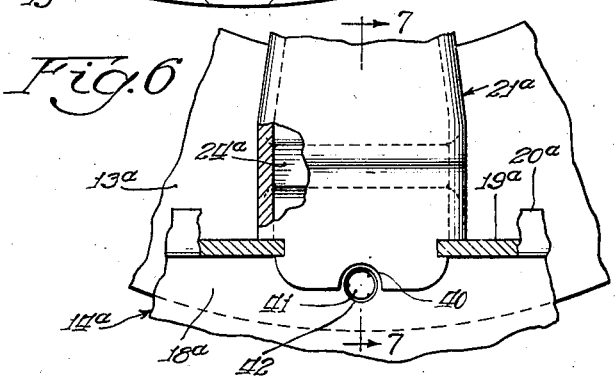
Inventor:
Harold Nutt
By: Edward C. Gritzbaugh
Atty.

July 8, 1941.  H. NUTT  2,248,378
FRICTION CLUTCH
Filed July 15, 1939  2 Sheets-Sheet 2
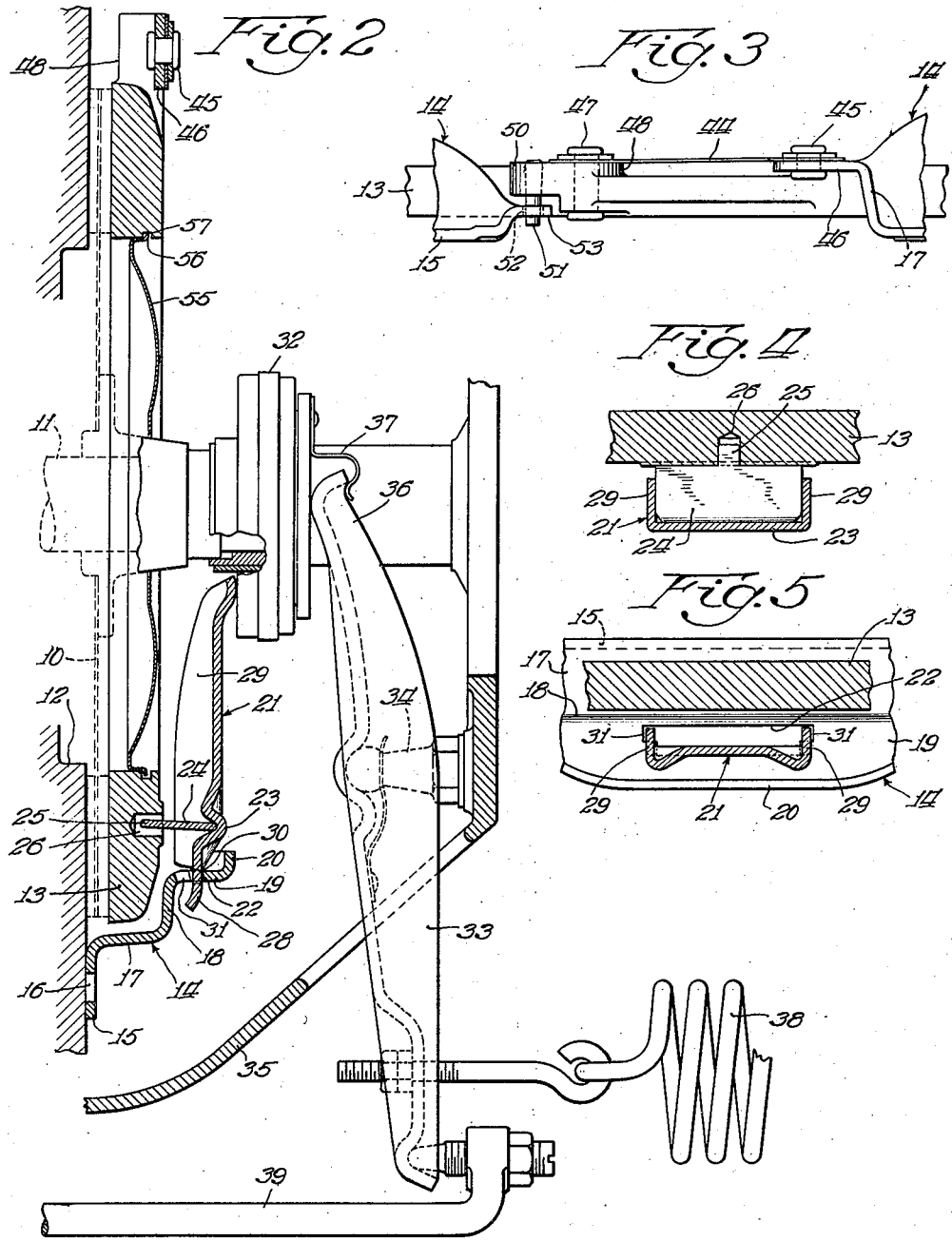
Inventor:
Harold Nutt
By Edward C. Gritzbaugh
Atty.

Patented July 8, 1941

2,248,378

UNITED STATES PATENT OFFICE 2,248,378

FRICTION CLUTCH

Harold Nutt, Chicago, Ill., assignor to Borg-Warner Corporation, Chicago, Ill., a corporation of Illinois Application July 15, 1939, Serial No. 284,606

14 Claims. (Cl. 192—68)

This invention relates to friction clutches of the type employed in motor vehicles, and has as its general object to provide a clutch of extremely light, simple and inexpensive construction, yet fully as efficient in operation as clutches now available.

In a conventional motor vehicle clutch, engagement is effected by a series of circumferentially spaced pressure springs interposed between the pressure plate and a cover which is attached to the fly-wheel of the vehicle engine and substantially completely encloses the pressure plate. Engagement of a clutch of this type is accomplished by release levers which are commonly mounted on the exterior of the cover.

A specific object of the present invention is to provide a clutch which has fewer parts than the conventional clutch referred to above.

Another object is to provide a clutch which is shallow in an axial dimension.

Another specific object is to reduce the material and labor cost involved in the relatively heavy stamping comprising the cover.

To the attainment of the foregoing objects, the invention contemplates that the spring pressure for clutch engagement may be furnished by a single pressure spring, removed from the clutch per se and transmitting its pressure to the clutch through the medium of a thrust bearing and a series of engaging levers acted upon by the bearing and in turn acting upon the pressure plate.

The invention contemplates a novel and improved arrangement of clutch operating levers, fulcruming means for the levers, and means for establishing a driving connection between such fulcruming means and the pressure plate, which arrangement is especially adapted for employment in a clutch wherein the levers constitute engagement levers for transmitting to the pressure plate, the thrust that is received from a remote pressure spring. Instead of the annular cover employed in the conventional clutch, the invention makes use of a series of circumferentially separated brackets, which serve, on the one hand, for mounting the engagement levers, and on the other hand, to anchor one end of each of a series of driving links for transmitting drive to the pressure plate.

Another object of the invention is to provide a novel and improved arrangement of circumferentially separated lever mounting brackets and pressure plate driving links of the flexible strap type, wherein the driving links are positioned substantially beyond the outline of the friction surface of the pressure plate so that the securing elements which connect the links to the pressure plate and the brackets respectively, do not interrupt the friction surface of the pressure plate. The invention further contemplates in this respect, an arrangement wherein the links are disposed chordally, so that the drive may be transmitted through them in lines substantially coinciding with their major axes, without radial components. Thus, the links may have maximum yieldability in an axial direction and minimum yieldability in a circumferential direction. To the attainment of these objects, the invention provides an arrangement wherein the driving links are located in the spaces between the separated ends of the lever fulcruming brackets. The invention contemplates the employment of this improved arrangement of lever fulcruming brackets and driving links, either in a clutch wherein the levers constitute engagement levers, or in the more conventional type of clutch wherein the levers constitute release levers.

Other objects, the advantages and uses of the invention will become more apparent after reading the following specification and claims, and after consideration of the drawings forming a part of the specification, wherein:

Fig. 1 is an elevation of a portion of a clutch embodying the invention, parts being broken away and shown in section;

Fig. 2 is an axial sectional view of the same taken as indicated by the line 2—2 of Fig. 1;

Fig. 3 is a side elevation of a portion of the same, illustrating the flexible driving links, viewed as indicated by the line 3—3 of Fig. 1;

Fig. 4 is a detailed sectional view taken as indicated by the line 4—4 of Fig. 1;

Fig. 5 is a detailed sectional view taken as indicated by the line 5—5 of Fig. 1;

Fig. 6 is a fragmentary view of a portion of a clutch embodying a slightly modified form of the invention; and Fig. 7 is a sectional view thereof taken as indicated by the line 7—7 of Fig. 6.

As an illustration of one form in which the invention may be embodied, I have shown in Figs. 1 to 5 inclusive, portions of a friction clutch which may include a driven element 10 mounted on a driven shaft 11, and adapted to be engaged between friction faces formed respectively on the engine flywheel 12 of the motor vehicle in which the clutch is installed, and on the pressure plate 13 of the clutch.

Instead of the conventional cover plate for housing the pressure plate 13, the present invention provides a series of circumferentially separated lever mounting brackets, indicated generally at 14, each including an arcuate flange portion 15 secured to the fly-wheel 12 by suitable securing elements 16a extended through openings 16 therein, and each including a raised portion comprising an arcuate wall 17 projecting rearwardly from the flange 15, and a shoulder 18 projecting radially inwardly from the arcuate wall 17. The inner extremity of the shoulder 18 merges in a chordal fulcrum wall 19 extending rearwardly. The rear extremity of the wall 19 terminates in an inwardly extending reinforcing flange 20 in the form of an arch the ends of which merge with the shoulder wall 18.

The arcuate wall 17, extending as it does to the chordal plane of the wall 19, rigidifies the entire bracket 14 up to the wall 19. The wall 19 is rigidified by the arching of the flange 20 with its end regions merging in the wall 18.

The clutch operating levers, referred to generally by the numeral 21, have their outer end regions extended through openings 22 in the wall 19, and fulcrumed against the rear edges thereof. Intermediate its ends, each lever is formed with a pocket 23 in which is received one side of a thrust strut 24, (see Figs. 2 and 4). The other side of the strut 24 is formed with a finger 25 which projects into a hole 26 in the pressure plate 13. The hole 26 and the pocket 23 retain the strut 24 in position, and the engagement of the longitudinal edges of the strut, which are rounded, against the bottom of the pocket 23 and the rear face of the pressure plate respectively, serves to transmit thrust from the lever to the pressure plate.

This method of location eliminates all but the simplest of machining operations on the pressure plate, i. e., turning and drilling. By forming the bracket 14 in the manner described above, with the shoulder wall 18 extending from end to end of the arcuate wall 17 and joined thereto, and the flange 20 in the form of an arch merging at its end with the shoulder portion 18, the fulcrum wall 19 may be extended to a position lying inwardly of the periphery of the pressure plate and rearwardly thereof, and yet associated with the flange 15 in a very rigid relation thereto. This is of considerable importance in view of the fact that the high pressure that is developed by the levers against their fulcrums, require the fulcrums to be very rigid. The rearward pressure of the outer end of a lever against its fulcrum is transmitted largely through the arched flange 20 directly to the end regions of the arcuate wall 17, thus avoiding any substantial rearward springing of the shoulder wall 18.

The lever 21 is provided in its side with notches 27 which receive the regions of the wall 19 at the end of the opening 22, and which define in the outer end region of the lever, wings 28 which engage the wall 19 to restrain the lever 21 against radially inward displacement from its proper position.

The lever 21 is formed with side flanges 29 which serve both to reinforce the lever, and to embrace the ends of the strut 24 so as to locate the lever against circumferential displacement. The flanges 29 also serve to locate the lever against radially outward displacement, being terminated at the inner extremities of the notches 27, and formed with V-shaped ends defining knife edges 30 which bear against the inner surface of the wall 19.

In order to allow insertion and removal of the lever 21, the opening 22 is elongated in its forward region, as at 31.

The clutch operating mechanism includes a thrust bearing 32, which is preferably of the ball-bearing type, mounted upon the shaft 11 and engaging the inner ends of the levers 21. An operating lever 33 is fulcrumed on a post 34 mounted in the clutch housing 35, and has at one end a fork 36 bearing against the thrust collar 32. A spring clip 37, secured to the collar 32, retains the end of the lever 36 in engagement with the collar at all times. The other end of the lever is attached to the pressure spring 38, and is engaged by an operating link 39 which is adapted to relieve the lever 33 of the load of the spring 38. The operating link 39 may be operatively connected to an operating pedal or other means for operating the clutch.

In Figs. 6 and 7 is shown a somewhat modified form of the lever mounting. The operating lever 21a bears directly against a lug 24a formed integrally with the pressure plate 13a, and at its outer end is provided with a notch 40 which partially receives a pin 41 mounted in the pressure plate 13a and projecting through an opening 42 in the wall 18a of the bracket 14a. The pin 41 and lug 24a both cooperate with the lever 21a in maintaining the latter in a truly radial position.

The pressure plate driving means comprises a series of drive links 44 each secured at one end by means of a rivet 45, to an ear 46 formed on one end of a bracket 15, and secured at its other end, by means of a rivet 47, to a lug 48 formed on the pressure plate 13 and projecting beyond the periphery thereof. The driving link 44 is preferably of thin spring sheet metal, such as spring steel.

It may be noted at this point that the raised portions of the brackets 14 extend over the peripheral regions of the pressure plate, but that the flanged portions 15 thereof, and the ears 46, which form raised continuations of the flanges 15, are disposed radially beyond the periphery of the pressure plate. Thus, the driving links 44 are positioned in substantially chordal relation to the periphery of the pressure plate, with their end regions, and the rivets 45, 47 lying beyond the outline of the friction face of the pressure plate. This is a distinct advantage, for the reason that if the driving links were riveted to the pressure plate within the outline of the friction face, the rivet holes would interrupt the friction surface, and form sharp edges tending to scrape the friction facings of the driven element 10 in an undesirable manner.

The driving links 44, and the members to which they are attached, occupy the otherwise unused space between the ends of the brackets 14, and thus do not add to the overall space occupied by the clutch.

In order to pilot the pressure plate against displacement in any direction in its own plane, relative to the bracket 14, the lugs 48 are provided with extensions 50 in which are mounted pins 51 projecting loosely through openings 52 in ears 53 formed on the ends of the brackets 14 opposite from the ears 46. Driving torque is transmitted through the flexible driving link 44.

The annular space between the inner periphery of the pressure plate 13, which is in the form of an annulus in accordance with conventional practice, and the hub of the driven element 10, is closed by an oil baffle disc 55 of thin sheet metal, having a peripheral flange 56 sprung into a shallow annular groove 57 in the pressure plate.

In the operation of the clutch, when the operating pedal is released, the spring 38 exerts a pull against the outer end of the lever 33, causing the inner end of the lever 33 to exert thrust against the thrust collar 32 which in turn exerts thrust against the inner ends of the levers 21. With their outer ends fulcruming against the rear edges of the openings 22 in the walls 19 of the brackets 14, the levers 21 will exert thrust against the pressure plate 13 through the medium of the struts 24, thus urging the pressure plate into engagement with the driven element 10 and engaging the latter between the friction faces of the pressure plate and the fly-wheel 12.

When it is desired to release the clutch, the operating pedal is depressed, causing the member 39 to exert a pull against the outer end of the operating lever 33, relieving the latter of the load of the spring 38, causing the lever 33 to fulcrum on the post 34, and relieving the pressure of the lever against the thrust collar 32. If desired, the driving links 44 may be formed so as to be biased under tension in the assembled clutch, in such a manner as to urge the pressure plate 13 away from the driven element 10 when the levers 21 are relieved of the thrust of the collar 32.

The pressure plate 13 is allowed to freely move in an axial direction in the engagement and disengagement of the clutch, by the flexibility of the driving links 44, which will flex as the plate moves.

I claim:

1. In a friction clutch, a driving element, a driven element, a pressure plate, a plurality of lever mounting brackets secured to the driving element in annular array, each of said brackets including an arcuate raised portion partially receiving a peripheral region of the pressure plate and a fulcrum portion extending rearwardly from said raised region and terminating in an inwardly turned arched flange, the end regions of which merge with said raised portion, a plurality of engagement levers extending through and fulcrumed in said fulcrum portion and arranged in thrust transmitting relationship to said pressure plate, and means for exerting thrust against the inner ends of said levers.

2. In a friction clutch, a driving element, a driven element, and a pressure plate adapted to engage the driven element against the driving element, an annularly arrayed series of brackets each including a radially outer region in the form of an arcuate flange secured to said driving element, a rearwardly raised inner region receiving a portion of the periphery of said pressure plate, said inner region including an arcuate wall merging with said flange, an inwardly extending shoulder parallel to the plane of the friction surfaces, and a rearwardly extending fulcrum portion terminating in an inwardly turned arched flange, the end regions of which merge with said shoulder, engagement levers fulcrumed at their outer ends on said fulcrum portion and in thrust transmitting relationship to said pressure plate, and means for exerting thrust against the inner ends of said levers.

3. In a friction clutch, a driving element, a driven element, a pressure plate adapted to engage the driven element against the driving element, an annularly arranged series of brackets secured to the driving element and having rearwardly extending fulcrum portions, engagement levers having their outer ends fulcrumed on said fulcrum portions and each having side flanges, a thrust strut interposed between each lever and the pressure plate, piloted in the pressure plate, and embraced by said flanges, and means for exerting thrust against the inner ends of the levers.

4. In a friction clutch, a driving element, a driven element, a pressure plate for engaging the driven element against the driving element, fulcrum means attached to the driving element, and including rearwardly extending fulcrum regions, engagement levers extended through and fulcrumed in openings in said fulcrum regions and each having a pair of side flanges terminating in outer end regions abutting the inner faces of said fulcrum regions to locate the lever against radially outward displacement, thrust struts interposed between each lever and the pressure plate, piloted in the pressure plate, and embraced by said side flanges, and means for exerting thrust against the inner ends of the levers.

5. In a friction clutch, a driving element, a driven element, a pressure plate for engaging the driven element against the driving element, an annularly arrayed series of circumferentially spaced fulcrum brackets attached to the driving element, and a flexible driving link disposed in the space between each adjacent pair of brackets, attached at one end to a bracket and at its other end to the pressure plate.

6. In a friction clutch, a driving element, a driven element, a pressure plate for engaging the driven element against the driving element, an annularly arrayed series of circumferentially spaced fulcrum brackets secured to the driving element and including fulcrum portions projecting rearwardly, engagement levers fulcrumed on said fulcrum portions and in thrust transmitting relationship to the pressure plate, means for exerting thrust against the inner ends of said levers, and flexible driving links disposed in the spaces between the adjacent ends of each pair of brackets, each link being attached at one end to one of the brackets and at its other end to the pressure plate.

7. A friction clutch as defined in claim 5, wherein said driving links are disposed substantially beyond the periphery of the pressure plate, and connected to the pressure plate through the medium of lugs extending radially from the pressure plate.

8. A friction clutch as defined in claim 5, wherein said driving links are positioned in substantially chordal relation to the periphery of the pressure plate, with their end regions lying substantially beyond said periphery.

9. In a friction clutch, a driving element, a driven element, a pressure plate for engaging the driven element against the driving element, an annularly arrayed series of circumferentially spaced fulcrum brackets secured to the driving element, engagement levers fulcrumed on said brackets and in thrust transmitting relationship to said pressure plate, lugs formed integrally with the pressure plate and projecting into the spaces between adjacent ends of the respective pairs of brackets, and flexible driving links in the form of relatively thin elongated straps, each attached at one end to one of said lugs and at its other end to an adjacent bracket.

10. A friction clutch as defined in claim 9, including a piloting connection between each of said lugs and an end region of the other of the pair of brackets.

11. In a friction clutch, a driving element, a driven element, a pressure plate for engaging the driven element against the driving element, fulcrum means secured to the driving element, including an inwardly projecting region, spaced rearwardly of the driving element, and formed with a rearwardly projecting chordal fulcrum portion rimmed by an inwardly projecting arched flange the end regions of which merge with said inwardly projecting region, engagement levers fulcrumed on said fulcrum portion and in thrust transmitting association with said pressure plate, and means for applying thrust to the inner ends of said engagement levers.

12. In a friction clutch, a driving element, a driven element, a pressure plate for engaging the driven element against the driving element, a plurality of annularly arrayed, circumferentially spaced brackets, each having a radially outer flange region secured to the driving element, a wall projecting rearwardly from said outer region, a shoulder projecting radially inwardly from said wall rearwardly of the pressure plate, and a fulcrum member projecting rearwardly from the inner extremity of said shoulder and terminating in an inwardly turned arched flange, the end regions of which merge with said shoulder, engagement levers fulcrumed at their outer ends on said fulcrum portion and in thrust transmitting relationship to said pressure plate, and means for exerting thrust against the inner ends of said levers.

13. A friction clutch as defined in claim 12, wherein said fulcrum member lies in a chordal plane.

14. In a friction clutch, a driving element, a driven element, a pressure plate for engaging the driven element against the driving element, fulcrum means attached to the driving element, engagement levers fulcrumed at their outer ends on said fulcrum means and each having a pair of side flanges terminating at their outer ends in means abutting inner faces of said fulcrum means to locate the levers against radially outward displacement, thrust struts interposed between each lever and the pressure plate, piloted in the pressure plate, and embraced by said side flanges, and means for exerting clutch engaging thrust against the inner ends of the levers.

HAROLD NUTT.